United States Patent
Larson

[11] 3,911,732
[45] Oct. 14, 1975

[54] OFF CENTER LOADING COMPENSATION FOR MULTIPLE ACTUATOR VIBRATION TABLE

[75] Inventor: Rodney L. Larson, Minnetonka, Minn.

[73] Assignee: MTS Systems Corporation, Minneapolis, Minn.

[22] Filed: July 29, 1974

[21] Appl. No.: 492,452

[52] U.S. Cl. .................................................. 73/71.6
[51] Int. Cl.² .......................................... G01N 29/00
[58] Field of Search......... 73/71.6, 71.5 R, 67, 67.2, 73/71.4; 318/564

[56] References Cited
UNITED STATES PATENTS

| | | | |
|---|---|---|---|
| 3,393,555 | 7/1968 | Flannelly | 73/71.6 |
| 3,477,281 | 11/1969 | Helmuth | 73/71.6 |
| 3,654,804 | 4/1972 | Helmuth | 73/71.6 |
| 3,800,588 | 4/1974 | Larson et al. | 73/71.6 |

OTHER PUBLICATIONS

Newton, Jack D., *Shock and Vibration Bulletin,* "Methods of Control of Multiple Shaker Testing System," Jan. 1966, No. 35, Part 2, pp. 85–96.

*Primary Examiner*—Richard C. Queisser
*Assistant Examiner*—Stephen A. Kreitman
*Attorney, Agent, or Firm*—Dugger, Johnson & Westman

[57] ABSTRACT

In a vibration table test system a circuit compensating for forces created when the center of mass of a test specimen, in combination with a support table, is spaced from the center of the vibration table. When the specimen is off center, if equal force is provided to all of the actuators on the table, the table will tend to tip or skew out of its plane of motion. The present device provides for a force balance circuitry that includes compensations for the amount of eccentricity of the center of mass of the combined table and specimen.

8 Claims, 3 Drawing Figures

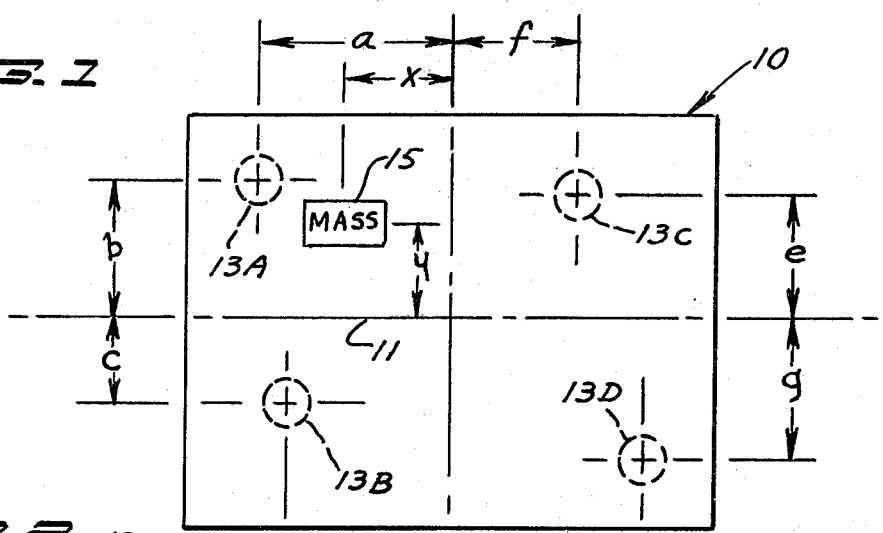
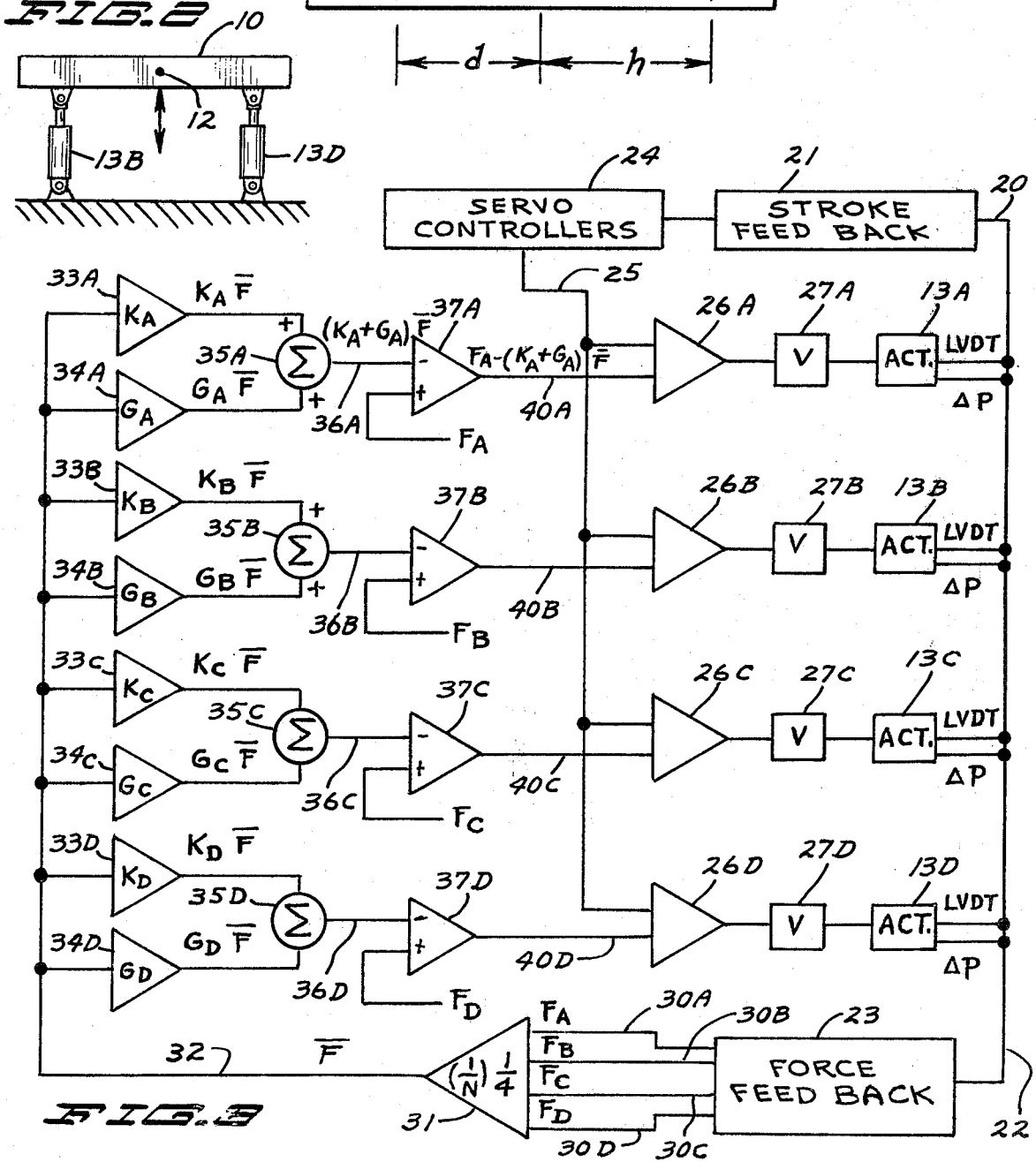

OFF CENTER LOADING COMPENSATION FOR MULTIPLE ACTUATOR VIBRATION TABLE

BACKGROUND OF THE INVENTION

1. Field of the Invention

The present invention relates to the control of multiple actuator vibrating tables and in particular means for compensating for an eccentric center of mass.

2. Prior Art

Vibrating tables used for testing specimens with multiple actuators for driving the table are disclosed in U.S. Pat. No. 3,800,588. In addition, U.S. Patent application Ser. No. 492,448, filed July 29, 1974 of Niel R. Petersen and Rodney L. Larson for MULTIPLE ACTUATOR CONTROL SYSTEM discloses a force balance circuitry for adjusting the force applied by each actuator in relation to the average force. This present specification deals with an improvement in the circuitry to compensate for situations where the center of mass of the combined specimen and table is eccentrically located from the geometrical center of the table, or in other words is offset from the control axes of the table.

SUMMARY OF THE INVENTION

The present invention relates to circuitry for controlling multiple actuator vibrating structures, and in particular for providing compensation necessary to ensure proper orientation of a vibrating table when the center of mass of the table and the specimen in combination is spaced from the center of the table and at a radius to at least one controlled axis.

A compensation signal which is a function of the eccentricity of the mass from the center of the table is derived and provided to force balance circuitry so that in driving the actuators, the control of each of the actuators will be compensated so that a greater share of the load will be carried by actuators closer to the center of mass than by actuators farther from the center of mass. The control system of the present invention includes scaling or weighting an average force signal derived by averaging the measured force of all of the actuators operating on a rigid table, as a function of the radius of action of the center of mass from each of a pair of selected control axes, and also as a function of the radius of the actuator from those axes, so that both the amount of offset of the mass as well as the lever arm or radius of action of the individual actuator is included as a factor in the control.

This weighted average force signal is then compared with the individual force for that actuator to develop a force balance signal for each of the actuators that provides a weighting for compensating for the amount eccentricity of the center of mass from the controlled axes.

BRIEF DESCRIPTION OF THE DRAWINGS

FIG. 1 is a top plan schematic view showing a vibrating table with an off center mass which can be compensated for by the control system of the present invention;

FIG. 2 is a schematic side view of the table of FIG. 1; and

FIG. 3 is a schematic representation of the control system used in the present invention.

DESCRIPTION OF THE PREFERRED EMBODIMENT

The use of rigid vibrating tables having specimens mounted thereon is generally described in the U.S. Pat. No. 3,800,588. The general control description for the various servo loops for controlling the multiple actuator rigid table is shown in U.S. application Ser. No. 492,448, previously identified, and therefore will not be shown in detail in this particular application. Reference is made to that application for more specific description of servo control systems.

The improvements of the present control system includes scaling or weighting the average force signal in a manner necessary to compensate for off center mass. The weighted signal as developed herein may be directly supplied to one input of the force balance comparator amplifiers of application Ser. No. 492,488, as will be apparent from this description.

Referring now to FIGS. 1 and 2, a rigid test table 10 is shown in plan view, and the actuators 13A through 13D are positioned below the table. The actuators are double acting, hydraulic actuators having servo valves controlling the stroke of the cylinders in relation to time to reciprocate the table in a vertical direction as shown by the double arrow of FIG. 2. The table has a pitch axis 11, and a roll axis 12 at right angles to each other. The individual actuators are shown only in dotted lines because they are underneath the table. The actuators move the table at substantially right angles to the plane defined by axes 11 and 12. These actuators are also shown schematically in FIG. 2 and in FIG. 3 as boxes. These actuators generally correspond to the actuators shown in U.S. patent application Ser. No. 492,488. Additional actuators or N-actuators can be utilized as desired.

The center of mass of the combined table and specimen is indicated generally at 15, and the amount of offset of the center of mass 15 from the pitch axis is indicated by radius $y$, and the distance or amount of offset of the center of mass from the roll axis is indicated by radius $x$. Considering the effect of the center of mass on the individual actuators, it will be noted that the actuator 13A is offset from the roll axis by an amount indicated by radius $a$, and from the pitch axis by an amount indicated by radius $b$; the actuator 13B is offset from the pitch axis 11 an amount indicated by radius $c$, and is offset from the roll axis by an amount indicated by radius $d$; the actuator 13C is offset from the pitch axis by an amount indicated by radius $e$, and is offset from the roll axis by an amount indicated by radius $f$; and the actuator 13D is offset from the pitch axis by an amount indicated by radius $g$, and offset from the roll axis 12 by an amount indicated by radius $h$.

Referring now to FIG. 3, the individual actuators are indicated schematically, and each of these actuators has transducers associated therewith to provide two types of feedback, one being a stroke feedback (LVDT) from stroke sensors, and the other being a force feedback ($\Delta P$) which is a force signal that is derived by sensing the differential pressure on opposite sides of the piston in the double acting actuators to provide a force signal. Individual signals are provided from each of the actuators, and these feedback signals are carried along a line 20 to the stroke feedback control circuitry 21, and carried along the line 22 to a force feedback control circuitry 23. The feedback providing means are indicated only schematically because they are well known.

Servo controllers indicated generally at 24 are provided for controlling the individual actuators, and will provide the necessary command signals, stabilization signals, and will compare the command signals with the feedback signals to develop control signals along the line 25 which are used as inputs to final amplifiers 26A through 26D, which in turn drive the valves 27A through 27D to control each of the individual actuators.

In order to provide equalization of the force on each of the actuators and in this way stabilize the actuators so that each will carry its share of the force, it has been explained in U.S. application Ser. No. 492,448 that an average force signal is developed. The force feedback circuitry 23 provides individual force signals along lines 30A through 30D and each of these force signals is indicated as an "F" with a subscript letter indicating the actuator from which this source signal is developed. Thus, these force signals are fed into an averaging amplifier 31, that sums the input signals and divides the total by the number of inputs to provide an output indicating the average force or $\overline{F}$ which is derived as follows:

$$\overline{F} = \frac{F_A + F_B + F_C + F_D}{4}$$

In the N-actuator case, where these are N-actuators, there would be an individual signal from each of the actuators and the total summation of the individual signals would be divided by N, or the number of actuators involved.

The average force signal $\overline{F}$ is delivered along the line 32 and is modified or weighted by passing this signal through adjustable gain multiplier amplifiers 33A through 33D and 34A through 34D. The amplifiers 33 and 34 provide the signals to summer 35A through 35D, and then on lines 36A through 36D to summing or comparator amplifiers 37A through 37D. The comparators 37 in turn each have second inputs which receive one of the individual force feedback signals comprising the actual force being applied by one of the individual actuators along lines 38A–38D. These inputs are merely labeled to show the signal provided but are actually connected to the actuator feedback means. The signals which are delivered from the comparator amplifiers 37A through 37D are provided along lines 40A through 40D and these signals are fed into inputs of the individual final summing amplifiers 26A through 26D which deliver the force balance or forced difference signals to the servo valves for the respective actuators.

The amplifiers 33A through 33D and 34A through 34D are the amplifiers that provide the scaling or weighting factors necessary for adjustment of the average force signal to compensate for an off center mass.

Referring now to FIG. 1, summing the moments about the roll axis 12, it can be seen that:

$$F_A a + F_B d - F_C f - F_D h = \overline{F}x. \tag{1}$$

Where the quantities have the values identified previously, namely the $F$ term represents the actual force for each of the individual actuators as designated by the subscript letter, and the lower case letter represents the radius of that actuator from the roll axis. $\overline{F}$ is the actual average force exerted by the actuators, and $x$ is the distance that the center of mass 15 is positioned from the roll axis 12.

Summing the moments on table 10 about the pitch axis 11 results in:

$$F_A b + F_C e - F_B c - F_D g = \overline{F}y \tag{2}$$

The quantities of the equation are represented in FIG. 1. The equations indicate the individual forces $F$ provided by each of the actuators and designated by the appropriate subscript, times the distance of the actuator from the pitch axis. The quantity $y$ is the distance of the center of mass 15 from the pitch axis and $\overline{F}$ is the average force.

In the placement of actuators on a table, it generally can be assumed that the actuators will be generally symmetrically located about the pitch and roll axis, but may have different lever arms or radii of action, as illustrated in FIG. 1. With an assumption of a general symmetrical placement of the actuators, the compensation for the actuator geometry (that is the different lever arms about the respective axes) can be compensated for at the same time that the effect for the off center mass is compensated for. With a generally symmetrical actuator geometry configuration, it can be assumed that each moment created will take one-fourth of the off center load. Therefore, it follows that:

(3) $\qquad F_A a = \dfrac{\overline{F}x}{4} \qquad F_C f = \dfrac{\overline{F}x}{4}$ $\qquad F_B d = \dfrac{\overline{F}x}{4} \qquad F_D h = \dfrac{\overline{F}x}{4}$ and (4) $\qquad F_A b = \dfrac{\overline{F}y}{4} \qquad F_B c = \dfrac{\overline{F}y}{4}$ $\qquad F_C e = \dfrac{\overline{F}y}{4} \qquad F_D g = \dfrac{\overline{F}y}{4}$ If the actuators are symmetrically located so that $a=b=f=h$, then the actuator geometry correction factor falls out of equation (1) above, and if $b=c=e=g$, the terms also fall out of equation (2). The correction factor to be applied to the actuators to compensate for geometric effects of specimens located about one axis will be designated $K$, and about the other axis will be designated $G$.

To complete the required compensation, the individual correction factor $K$ and $G$ will be used to weight the average force signal provided at the input of each of the comparator amplifiers 37A through 37D.

The output of each of the amplifiers 33A through 33D is $K_A\overline{F}$, $K_B\overline{F}$, $K_C\overline{F}$ and $K_D\overline{F}$, respectively, where $K$ represents the desired scaled gain of the amplifier. Neglecting the required correction for mass offset about the other axis, this corrected average force summed with individual force from that actuator provides the desired correction signal ($F_i - K\overline{F}$ = desired correction). For a specific case, we would arrive at the equation $F_A - K\overline{F}$ = desired correction. When the correction is zero, this equation becomes $K_A\overline{F} = \overline{F}_A$ or by substitution in (3) above $$K_A\overline{F} = \frac{\overline{F}x}{4a}$$

and therefore for the roll axis correction $$K_A = \frac{x}{4a}$$

The correction factor for offset of the mass about the other axis is obtained in the same manner, and the value of $G_A$ comprising the output from amplifier 34A would be $$G_A = \frac{y}{4b}$$

The two correction factors $K$ and $G$ are additive and by summing at summer 35A, the signal on line 36A will be $(G_A + K_A)\overline{F}$.

For each of the amplifiers 33B, 33C and 33D, and 34B, 34C and 34D, the factors would be as follows:

$$K_B = \frac{x}{4d}; G_B = \frac{y}{4c}; K_C = \frac{x}{4f}; G_C = \frac{y}{4e}; K_D = \frac{x}{4h}$$
$$\text{and } G_D = \frac{y}{4g}$$

The inputs to summing amplifiers 35A through 35D are selected in polarities so that they will give the proper signal along the respective lines 40A through 40D to provide for a signal that will drive the valve for the actuators in the proper sense to bring the actuators to the proper force level. The signals include the correction factors for the off center mass as well as the geometry characteristics. The signals on lines 40A through 40D represent the discrepancy of the force being exerted by each actuator from the average force of the actuator after weighting the average force to compensate for the off center mass.

In the general case the factor for correction of the average force signal comprises $$C_i = \frac{x}{Na}$$

where $C$ is the constant, $x$ is the distance from the axis to the center of mass, $a$ is the distance from the axis to actuator $i$ and $N$ is the number of actuators which are spaced from the axis and are reciprocating the structure. If the actuator geometry is not very symmetrical then the assumption of equal sharing of the loads or torques is not strictly valid. However, the contribution toward torque balance or force balance can be optimized to produce the least variance between the heaviest and lightest loaded actuators in the form disclosed. Locating the actuators somewhat symmetrically, however, doe simplify the control implementation and adjustment.

Each of the individual amplifiers can have adjustable gains, which will be utilized for proper balance of the signals. It should be noted again that the amplifiers 26A through 26D correspond to amplifiers 100 in U.S. patent application Ser. No. 492,448, and the amplifiers 37A through 37D of the present disclosure correspond to the amplifiers 85 in that U.S. application Ser. No. 492,448.

What is claimed is:

1. A test apparatus comprising a plurality of displacement generating actuators for displacing a test structure for movement in a vibratory path, said structure having at least one axis about which the displacement of the structure is to be controlled, and said structure having a center of mass offset from said one axis, at least some of said plurality of actuators also acting at points spaced from said one axis, means to control said actuators for reciprocating movement in their desired vibratory path, including means connected to each actuator to provide separate signals indicating force applied to said structure by that actuator, means to provide a signal indicating the average force actually applied to said test structure by said actuators, means to separately modify said average force signal for each of said some actuators by a factor which is a function of the distance said center of mass is offset from said axis and the distance that each of said some actuators is from said axis with respect to the distance from said axis of the other of said some actuators, and means to compare the individual force exerted by each of said some actuators with the separately modified average force signal for that actuator to provide a force balance signal in said means to control representing the difference between the force actually applied to the structure by that actuator and the separately modified average force signal for that actuator.

2. The combination as specified in claim 1 wherein said center of mass is also offset from a second axis mutually perpendicular to the first mentioned axis, and at least one of said actuators is positioned to act on said structure at a position spaced from said second axis, and second means to separately modify the average force signal for each of the actuators spaced from said second axis by a factor which is a function of the distance said mass is from said second axis and the distance said one actuator is from said second axis in relation to the distance of any other actuators from said second axis, means to sum said first modified average force signal for said one actuator with said second modified average force signal, and means to connect said means to sum to said means to compare.

3. The combination of claim 2 wherein said means to compare comprises a comparator amplifier.

4. The combination of claim 2 wherein said means to provide said average force signal comprises an averaging amplifier connected to receive force signals from each actuator and to provide an output representing the sum of the inputs divided by the number of inputs.

5. The combination of claim 1 wherein said means to modify comprises means to multiply said average force signal by a constant factor.

6. A control system for a test structure being vibrated in opposite directions in a vibratory path comprising a plurality of reciprocating actuators connected to said structure in spaced locations for moving said structure in said vibratory path, said structure having at least one axis spaced from some of said actuators by radii of actuator action and about which axis the structure is to be controlled, and having a center of mass spaced from said one axis by a distance equal to $x$, means to control said actuators for reciprocating movement including servo control means connected to the actuators and providing signals to drive said actuators, and means connected to said servo control means for providing compensation signals for each of said some actuators for balancing the forces exerted by said actuators and for compensating for loading of actuators closest to said center of mass, comprising means connected to each actuator to provide signals representing the force applied to the structure by said actuator, means to provide an average force signal representing the average force actually applied to the structure by each of said actuators, means to weight said average force signal for each of said some actuators by multiplying the average force signal by a quantity substantially equal to $(x/Na)$ where $N$ is the number of actuators controlling the vibratory structure, and $a$ is the distance from the axis of the respective actuator being controlled, and means to provide a force discrepancy signal indicative of the difference between the force actually exerted by the respective actuator and the average force signal modified by said quantity for that actuator.

7. In a test apparatus comprising a structure vibrated in opposite directions with a plurality of reciprocating actuators spaced at separate radii of action from a control axis on said structure and wherein said structure has a center of mass also spaced from said control axis, said apparatus having control means for controlling said actuators including comparison means connected to the actuators to provide a signal representing the difference between the undivided force actually being exerted by each of the actuators, and an average force signal comprising the average of the force exerted by the actuators, the improvement comprising means connected to the comparison means to modify said average force signal for each of said actuators spaced from said axis by a factor relating to the amount of offset of said center of mass from said axis and the respective distances of each of the actuators from said axis before comparing the average force signal with the individual force, including means to receive said average force signal, and to multiply said average force signal by a factor equal to $K_i$ where $K_i = (x/Na)$, and where $K$ is the radius of the mass from said axis, $a$ is the radius of the respective actuator from said axis, and $N$ is the number of actuators that are offset from said axis.

8. The combination as specified in claim 6 wherein said structure is controlled about a second axis mutually perpendicular to said first mentioned axis and the center of mass is also offset from said second axis, said means to modify said average force signal including a second means to receive said average force signal and to provide a second signal representing the average force signal multiplied by a factor equal to $G_i$ where $G_i = (y/Nb)$, and where $y$ is the radius of said means from said second axis, $b$ is the radius of action of the respective actuator from said second axis and $N$ is the number of actuators that are offset from said axis, and said means to modify further includes means to sum the signals from the first mentioned means to multiply and said second means.

* * * * *

UNITED STATES PATENT AND TRADEMARK OFFICE
CERTIFICATE OF CORRECTION

PATENT NO. : 3,911,732
DATED : October 14, 1975
INVENTOR(S) : Rodney L. Larson

It is certified that error appears in the above-identified patent and that said Letters Patent are hereby corrected as shown below:

Column 5, line 54 "doe" should be--does--. Column 8, line 7, (Claim 7, line 21) cancel "K" (third occurrence) and insert--x--; Column 8, line 11, (Claim 8, line 1) "Claim 6" should be--Claim 7--; Column 8, line 19, (Claim 8, line 9) "means" should be--mass--; Column 8, line 23, (Claim 8, line 12 before "axis" insert--second--.

Signed and Sealed this third Day of February 1976

[SEAL]

Attest:

RUTH C. MASON
Attesting Officer

C. MARSHALL DANN
Commissioner of Patents and Trademarks